Nov. 24, 1931. C. V. BARNHART 1,833,149
CULTIVATOR
Filed Nov. 19, 1930 2 Sheets-Sheet 1
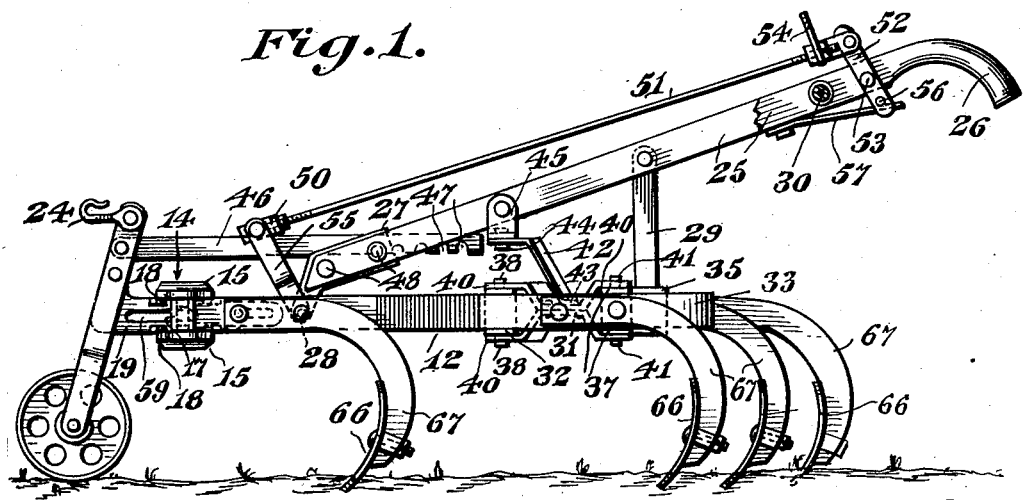
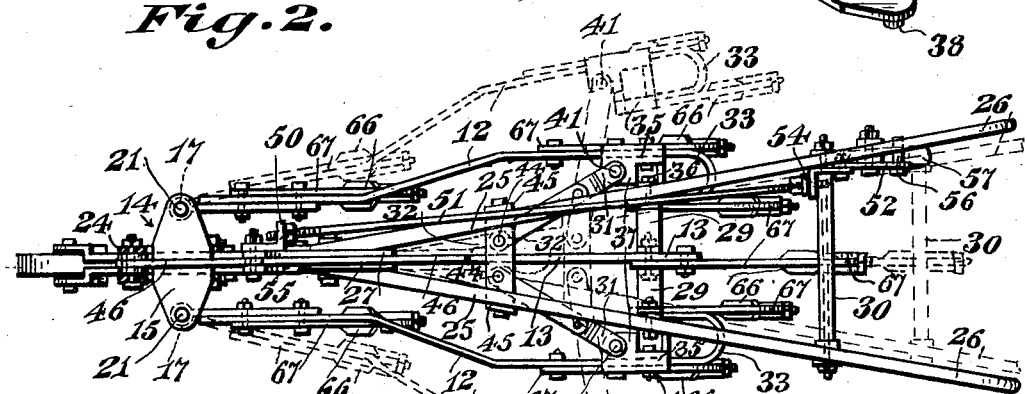
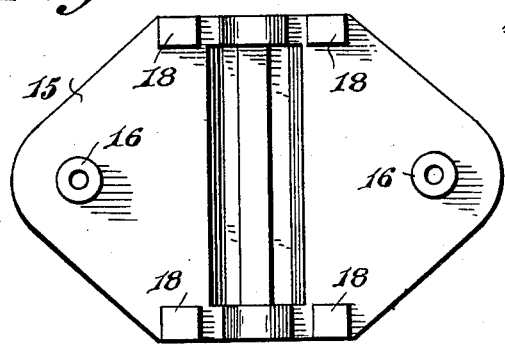
INVENTOR.
Clarence V. Barnhart,
BY
ATTORNEY.

Nov. 24, 1931. C. V. BARNHART 1,833,149
CULTIVATOR
Filed Nov. 19, 1930 2 Sheets-Sheet 2
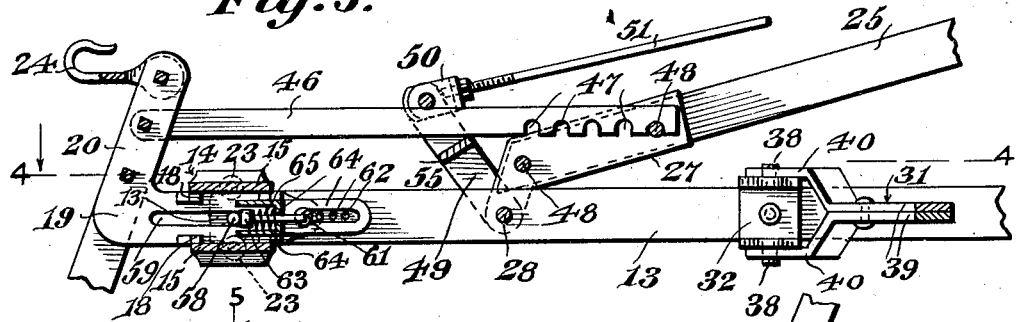
INVENTOR.
Clarence V. Barnhart,
BY
ATTORNEY.

Patented Nov. 24, 1931

1,833,149

UNITED STATES PATENT OFFICE

CLARENCE V. BARNHART, OF WAYNESBORO, PENNSYLVANIA

CULTIVATOR

Application filed November 19, 1930. Serial No. 496,724.

In that type of cultivator now in common use, involving a central beam and swinging side beams that can be adjusted to different distances apart so as to properly cultivate between rows that are correspondingly spaced, it often becomes necessary to vary the width of the cultivator during the cultivating operation due to irregularly spaced rows, and at the ends of the rows it is usually necessary to make a relatively wide turn and remove the cultivator from the ground. With the ordinary cultivator a lever separate from the handles is employed for spreading or drawing inwardly the side beams and when it is necessary to operate the lever, it becomes necessary to release one of the guiding or holding handles of the cultivator, making it an awkward and not always a successful operation.

One of the objects of the present invention is to provide an adjustable cultivator or like tool, in which the operator while holding the handles, can easily spread apart or contract the cultivator without releasing his grasp and therefore without affecting the guiding operation, means being provided whereby this variation can be accomplished without any material effort on the part of the operator.

A further and important object is to provide means by which the relatively adjustable beams can be locked and thus set in a desired adjusted relation, so that where the rows are evenly and properly spaced and no adjustment is required, no attention need be given to maintaining the desired fixed relation.

Still further objects are to provide a structure that is simple, practicable and commercially feasible.

In the accompanying drawings:

Figure 1 is a side elevation of a cultivator constructed in accordance with the present invention.

Figure 2 is a top plan view of the same.

Figure 3 is a vertical longitudinal sectional view through the front portion.

Figure 4 is a horizontal sectional view taken on the line 4—4 of Figure 3.

Figure 5 is a cross sectional view and on an enlarged scale on the line 5—5 of Figure 4.

Figure 6 is a plan view of the rear end of one of the side beams.

Figure 7 is a cross sectional view on the line 7—7 of Figure 6.

Figure 8 is a detail side elevation of a portion of the draft head, showing the boxing for the cushion and stop.

Figure 9 is a plan view of one of the draft head plates.

Figure 10 is a perspective view of one of the spreader links.

Figure 11 is a detail perspective view of one of the mountings for the spreader links.

In the embodiment disclosed, two side beams, designated 12, are employed, between which is located an intermediate or center beam 13. The side beams are pivoted to a draft head, designated generally by the reference numeral 14, and in this draft head the intermediate beam 13 has a mounting that permits its longitudinal sliding movement.

In the preferred form of construction the draft head consists of upper and lower plates 15 corresponding in form, and one of which is shown in inside plan in Figure 9. These plates are provided with oppositely disposed gudgeons 16, on which the eyes 17 of the side beams 12 are journaled (see Figure 5). The plates furthermore have on their inner sides lugs 18, providing positioning elements for draft plates 19 that are interlocked with the plates 15 and terminate in upstanding necks 20. These plates 19, as shown in Figure 5, are located on opposite sides of the central beam 13. The said plates 15 may be secured together in any suitable manner, as for example, by bolts 21. The central portions of the plates 15 are outset to provide on their inner sides runways 22, and in these runways are located flanged rollers 23, against which the upper and lower edges of the center beam 13 ride so as to provide a substantially non-friction bearing for said beam in the said draft head. Secured to the upper ends of the necks 20 is a suitable clevis 24, constituting means for hitching to the implement, a horse or other draft power.

The means for guiding or holding the cultivator while at work consists of a pair of handle bars 25 which may be of the usual form, terminating at their upper ends in hand grips 26. These bars are fixed to the center beam 13 by having their lower ends secured to a bracket 27 that is fastened, as shown at 28, to the front portion of the center beam behind the draft head 14. Braces 29 secure the central portions of the handle bars 25 to said center beam. Thus the handles, it will be noted, are fixed with relation to the center beam, and being tied by a cross brace 30, always maintain their relative relation to each other. That is to say, they do not spread or move laterally with any of the other moving parts of the implement.

The side beams 12 are connected to the center beam by adjusting links 31. To this end they are secured to opposite sides of the central portion of the center beam 13 by brackets 32. The rear ends of the side beams 12 are bent into loops 33 so that the terminal portions of said beams extend forwardly, as shown at 34. In these loops are located spacer boxes 35 that are bolted, as shown at 36, to the legs of the loops and have forwardly extending ears 37. The brackets 32 have oppositely extending gudgeons 38. The links 31 are preferably made up of two bars 39 suitably secured together and having their terminals spaced apart, as illustrated at 40. (See Figure 10). These portions 40 at one end embrace the bracket 32 and are journaled on the gudgeons 38, while the other spaced ends are similarly engaged on gudgeons 41 formed upon the ears 37. Preferably also links 42 are pivoted, as shown at 43, to the links 31 and have pivotal connections 44 with brackets 45 secured to the handle bars 25.

Means are provided for locking the intermediate beam 13 against its longitudinal sliding movement and in different positions. As shown this means consists of a latch bar 46 pivoted to and between the upstanding necks 20 of the draft members, and having in its rear end a series of notches 47, any one of which is adapted to receive one of the bolts 48 that secure the handle bars 25 to the bracket 27. Obviously when the parts are thus engaged, as shown for instance in Figure 3, the intermediate beam 13 cannot slide in the draft head 14. In order to swing the latch bar 46 to and from its active or locking position, a cam member 49 is pivoted on the bolt 28 and has its upper end pivotally connected to a yoke 50. This yoke has a link connection 51 with a swinging lever 52 fulcrumed between its ends 53 on one of the handle bars 25 adjacent to the handle grip 26. A thumb plate 54 serves as a convenient means for moving the lever 52. The cam member 49 has a cross bar 55 adapted to engage the underside of the latch bar 46, while the yoke 50 rests upon said latch bar. By pushing upon the finger plate 54, the yoke 50 is caused to press upon the bar 46 and move it downwardly so that it will interlock with the bolt 48. By pulling upon the finger piece the cross bar 55 of the cam member 49 will engage the underside of the latch bar and raise it so as to disengage the bolt 48. In order that the parts will be held when moved to either of the above described positions, the lower end of the lever 52 is provided with a cross pin 56 that rides against a spring 57 fastened to the underside of the handle bar, this cross pin moving to oposite sides of a dead center so that the spring will operate to hold the lever 52 in either of its reversed positions.

In order to limit the rearward longitudinal movement of the intermediate beam 13 an adjustable stop means is provided. Thus, as shown particularly in Figure 4, the front end of the beam 13, which slides in the draft head 14, has a cross pin 58 that extends through longitudinal slots 59 formed in the brackets 19. On the outer side of said brackets are secured stop plates 60 by bolts or screws 61 that are adapted to be passed through any of a series of openings 62 formed in the plates. The front ends of these plates are positioned in the path of the cross pin 58 and consequently will limit the rearward movement of the center beam. In order that this rearward movement may be cushioned, yielding plungers 63 are also preferably placed in the path of the cross pin and are located in boxes 64 secured by the screws 61. The plungers have springs 65 behind them.

It will be understood that any suitable earth agitating means may be mounted on the beams 12—13. Thus in the present structure cultivator shovels are shown at 66, the same being carried by legs 67 bolted to the side beams and center beam. Preferably a pair of these cultivator members is secured to the opposite sides of the looped portions 33—34.

In using this cultivator, where the rows are equally spaced apart, the side beams can be separated the desired distance, either by pushing or pulling upon the handle bars 25, the center beam being released or free of the latch bar 46. When the center beam is thus slid in the draft head, the links 31 are swung toward and from a more nearly right angular relation to the center beam 13, thereby spreading apart or drawing together the side beams, as will be evident. When properly positioned, the latch 46 is dropped by operating upon the finger piece 54, so that the center beam 13 is held in fixed relation to the draft head. The frame therefore becomes rigid. If, however the rows are unevenly spaced and vary in width and it becomes desirable to shift the outer or side beams while progressing between such rows, the center beam is unlatched and the operator using the handle bars 25 to hold and guide the cultivator, can easily vary the positions of the side beams by simply pushing forward or pulling back on the handles as the cultivator advances. In doing this, he obviously shifts the side beams in and out. The structure is such that this adjustment can be made with the greatest ease because the resistance due to the cultivator teeth in the ground, practically balances the strain upon the parts, and therefore the guiding and holding handles perform the additional function of adjusting means. When the end of a row is reached, and it is desired to turn the cultivator to start down another row, by pushing forwardly, the handles or side beams are brought in close to the center beam and the turn can be made very conveniently and in a short range. In order to avoid the possibility of the operator spreading the side beams too far apart, and thus causing the outer cultivator teeth to engage or come too close to the plants in the rows, the stops 60 are provided. By adjusting these forwardly to greater or less extent, the cross pin 58 will limit the backward movement of the center beam with respect to the draft head and thus limit the angularity that may be assumed by the links 31.

A simple and entirely practicable structure is thus provided, in which the operator, while at work, can readily maintain the desired relation of the cultivating tools to the plants without ever removing his hands from the directing and holding handles. At the same time, as explained, the cultivator can be adjusted and fixed in a desired adjusted position. The parts moreover can be easily and cheaply manufactured.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. In a cultivator, the combination with separable side members, of means for connecting draft power thereto, another member between the side members movable with respect thereto, handle means for thus moving the intermediate member and for guiding the cultivator, and connections between the intermediate member and side members for causing the side members to separate or be moved towards each other on the movement of the intermediate member with respect to the side members.

2. In a cultivator, the combination with separable swinging side members, of means for connecting draft power thereto, another member longitudinally slidable between the side members, handle means for thus moving the intermediate member and for guiding the cultivator, and connections between the intermediate member and side members for causing the side members to swing on the movement of the intermediate member with respect to the side members.

3. In a cultivator, the combination with a draft head having means for attachment of draft power thereto, of side beams pivoted to the draft head, an intermediate beam longitudinally slidable in the draft head and being directly free of the draft attachment means, handles for the cultivator mounted on the intermediate beam and constituting means for sliding said beam in the head, and links connecting the intermediate beam and side beams for causing the side beams to swing when the intermediate beam is slid in the head.

4. In a cultivator, the combination with separable side members, of means for connecting draft power thereto, another member between the side members movable with respect thereto, handle means for thus moving the intermediate member and for guiding the cultivator, connections between the intermediate member and side members for causing the side members to separate or be moved towards each other on the movement of the intermediate member with respect to the side members, and means for locking the intermediate member against movement with respect to the side members.

5. In a cultivator, the combination with separable side members, of means for connecting draft power thereto, another member between the side members movable with respect thereto, handle means for thus moving the intermediate member and for guiding the cultivator, connections between the intermediate member and side members for causing the side members to separate or be moved towards each other on the movement of the intermediate member with respect to the side members, means for locking the intermediate member against movement with respect to the side members, and operating mechanism for the lock mounted on the handle means.

6. In a cultivator, the combination with separable swinging side members, of means for connecting draft power thereto, another member longitudinally slidable between the side members, handle means for thus moving the intermediate member and for guiding the cultivator, connections between the intermediate member and side members for causing the side members to swing on the movement of the intermediate member with respect to the side members, and a latch for holding the intermediate member against its longitudinal sliding movement.

7. In a cultivator, the combination with separable swinging side members, of means for connecting draft power thereto, another member longitudinally slidable between the side members, handle means for thus moving the intermediate member and for guiding the cultivator, connections between the intermediate member and side members for causing the side members to swing on the movement of the intermediate member with respect to the side members, a latch for holding the intermediate member against its longitudinal sliding movement, and an operating device for the latch mounted on the handle members.

8. In a cultivator, the combination with a draft head having means for attachment of draft power thereto, of side beams pivoted to the draft head, an intermediate beam longitudinally slidable in the draft head and being directly free of the draft attachment means, handles for the cultivator mounted on the intermediate beam and constituting means for sliding said beam in the head, links connecting the intermediate beam and side beams for causing the side beams to swing when the intermediate beam is slid in the head, and a latch pivoted on the draft head and having a detachable engagement with the intermediate bar to secure the bar against its sliding movement.

9. In a cultivator, the combination with a draft head having means for attachment of draft power thereto, of side beams pivoted to the draft head, an intermediate beam longitudinally slidable in the draft head and being directly free of the draft attachment means, handles for the cultivator mounted on the intermediate beam and constituting means for sliding said beam in the head, links connecting the intermediate beam and side beams for causing the side beams to swing when the intermediate beam is slid in the head, a latch pivoted on the draft head and having a detachable engagement with the intermediate bar to secure the bar against its sliding movement, an actuating device mounted on one of the handles, and a link connection between the actuating device and the latch.

10. In a cultivator, the combination with a draft head having means for attachment of draft power thereto, of side beams pivoted to the draft head, an intermediate beam longitudinally slidable in the draft head and being directly free of the draft attachment means, handles for the cultivator mounted on the intermediate beam and constituting means for sliding said beam in the head, and links connecting the intermediate beam and side beams for causing the side beams to swing when the intermediate beam is slid in the head, said draft head and intermediate bar being provided one with a latch and the other with a keeper to be engaged by the latch to hold the bar against its sliding movement.

11. In a cultivator, the combination with a draft head having means for attachment of draft power thereto, of side beams pivoted to the draft head, an intermediate beam longitudinally slidable in the draft head and being directly free of the draft attachment means, handles for the cultivator mounted on the intermediate beam and constituting means for sliding said beam in the head, links connecting the intermediate beam and side beams for causing the side beams to swing when the intermediate beam is slid in the head, a latch pivoted on the draft head and having a detachable engagement with the intermediate beam to secure the beam against its sliding movement, a cam for swinging the latch, an operating trigger pivoted on one of the handles, a link connecting the trigger and cam, and a spring for holding the trigger with the latch when in its operative or its inoperative position.

12. In a cultivator, the combination with separable side members, of means for connecting draft power thereto, another member between the side members movable with respect thereto, handle means for thus moving the intermediate member and for guiding the cultivator, connections between the intermediate member and side members for causing the side members to separate or be moved towards each other on the movement of the intermediate member with respect to the side members, and means for limiting the separable movement of the side members by the movement of the operable member.

13. In a cultivator, the combination with separable side members, of means for connecting the draft power thereto, another member between the side members movable with respect thereto, handle means for thus moving the intermediate member and for guiding the cultivator, connections between the intermediate member and side members for causing the side members to separate or be moved towards each other on the movement of the intermediate member with respect to the side members, and means for limiting the separable movement of the side members by the movement of the operable member, said means being adjustable to vary the said separable movement.

14. In a cultivator, the combination with a draft head having means for attachment of draft power thereto, of side beams pivoted to the draft head, an intermediate beam longitudinally slidable in the draft head and being directly free of the draft attachment means, handles for the cultivator mounted on the intermediate beam and constituting means for sliding said beam in the head, links connecting the intermediate beam and side beams for causing the side beams to swing when the intermediate beam is slid in the head, and means for limiting the swinging movement of the beams.

15. In a cultivator, the combination with a draft head having means for attachment of draft power thereto, of side beams pivoted to the draft head, an intermediate beam longitudinally slidable in the draft head and being directly free of the draft attachment means, handles for the cultivator mounted on the intermediate beam and constituting means for sliding said beam in the head, links connecting the intermediate beam and side beams for causing the side beams to swing when the intermediate beam is slid in the head, a stop mounted on and movable with the intermediate beam, and an abutment adjustably mounted on the draft head and located in the path of the stop to limit the movement of the intermediate beam and thereby the swinging of the side beams.

16. In a cultivator, the combination with a draft head having means for attachment of draft power thereto, of side beams pivoted to the draft head, an intermediate beam longitudinally slidable in the draft head and being directly free of the draft attachment means, handles for the cultivator mounted on the intermediate beam and constituting means for sliding said beam in the head, links connecting the intermediate beam and side beams for causing the side beams to swing when the intermediate beam is slid in the head, a stop mounted on and movable with the intermediate beam, and an abutment adjustably mounted on the draft head and located in the path of the stop to limit the movement of the intermediate beam and thereby the swinging of the side beams, and a yielding cushion associated with the stop.

17. In a cultivator, the combination with a draft head having a guideway therethrough, of side beams pivoted to the draft head on opposite sides of the guideway, an intermediate beam slidable in the guideway, a roller bearing on the head for the intermediate beam, handles fixed to the intermediate beam for sliding it and for guiding the cultivator, and links connecting the intermediate beam and side beams for swinging the latter on the sliding of the intermediate beam.

18. In a cultivator, the combination with a draft head having a guideway therethrough, of side beams pivoted to the draft head on opposite sides of the guideway, an intermediate beam slidable in the guideway, a roller bearing in the head for the intermediate beam, handles fixed to the intermediate beam for sliding it and for guiding the cultivator, links connecting the intermediate beam and side beams for swinging the latter on the sliding of the intermediate beam, a cross pin carried by the intermediate beam and an adjustable stop against which the cross pin abuts to limit the movement of the intermediate beam and the swinging movements of the side beams.

In testimony whereof, I affix my signature.

CLARENCE V. BARNHART.